(12) United States Patent
Masquelier et al.

(10) Patent No.: US 10,403,419 B2
(45) Date of Patent: Sep. 3, 2019

(54) PROCESS FOR MANUFACTURING A COMPOSITE MATERIAL

(71) Applicant: NEXANS, Paris (FR)

(72) Inventors: Nicolas Masquelier, Phalempin (FR); Emilien Comoret, Rouvray (FR)

(73) Assignee: NEXANS, Courbevoie (FR)

( * ) Notice: Subject to any disclaimer, the term of this patent is extended or adjusted under 35 U.S.C. 154(b) by 264 days.

(21) Appl. No.: 15/126,891

(22) PCT Filed: Mar. 5, 2015

(86) PCT No.: PCT/FR2015/050548
§ 371 (c)(1),
(2) Date: Sep. 16, 2016

(87) PCT Pub. No.: WO2015/140443
PCT Pub. Date: Sep. 24, 2015

(65) Prior Publication Data
US 2017/0092390 A1    Mar. 30, 2017

(30) Foreign Application Priority Data
Mar. 18, 2014    (FR) .................................... 14 52231

(51) Int. Cl.
| | | |
|---|---|---|
| *B22D 19/14* | (2006.01) |
| *B22D 23/00* | (2006.01) |
| *C22C 1/10* | (2006.01) |
| *C22C 47/08* | (2006.01) |
| *C22C 49/14* | (2006.01) |
| *H01B 13/00* | (2006.01) |
| *B22F 3/20* | (2006.01) |
| *C22C 47/04* | (2006.01) |
| *C22C 49/04* | (2006.01) |
| *C22C 49/06* | (2006.01) |
| *H01B 1/02* | (2006.01) |
| *H01B 1/04* | (2006.01) |
| *H01B 7/02* | (2006.01) |
| *H01B 7/18* | (2006.01) |
| *C01B 32/174* | (2017.01) |
| *C22C 26/00* | (2006.01) |
| *B82Y 30/00* | (2011.01) |
| *B82Y 40/00* | (2011.01) |

(52) U.S. Cl.
CPC .......... *H01B 13/0016* (2013.01); *B22F 3/20* (2013.01); *C01B 32/174* (2017.08); *C22C 1/1036* (2013.01); *C22C 47/04* (2013.01); *C22C 47/08* (2013.01); *C22C 49/04* (2013.01); *C22C 49/06* (2013.01); *C22C 49/14* (2013.01); *H01B 1/02* (2013.01); *H01B 1/023* (2013.01); *H01B 1/026* (2013.01); *H01B 1/04* (2013.01); *H01B 7/0208* (2013.01); *H01B 7/18* (2013.01); *B22F 2003/208* (2013.01); *B82Y 30/00* (2013.01); *B82Y 40/00* (2013.01); *C22C 2001/1047* (2013.01); *C22C 2026/002* (2013.01); *Y10S 977/745* (2013.01); *Y10S 977/842* (2013.01)

(58) Field of Classification Search
CPC ...... B22D 19/14; B22D 23/00; C22C 1/1036; C22C 2001/1047; C22C 2026/002; C22C 47/08; C22C 49/14
USPC ................................................ 164/79, 91, 97
See application file for complete search history.

(56) References Cited

U.S. PATENT DOCUMENTS

| | | |
|---|---|---|
| 2012/0121890 A1 | 5/2012 | Weiland et al. |
| 2012/0267141 A1 | 10/2012 | Kamiyama et al. |

FOREIGN PATENT DOCUMENTS

| | | |
|---|---|---|
| WO | WO 02099824 | 12/2002 |

OTHER PUBLICATIONS

Search Report dated Jun. 1, 2015.

*Primary Examiner* — Kevin P Kerns
(74) *Attorney, Agent, or Firm* — Sofer & Haroun, LLP

(57) ABSTRACT

A process is provided for manufacturing a composite material with functionalized carbon nanotubes and a metal matrix. The arrangement also includes manufacturing an elongated electrically conductive element, and an electrical cable with such an elongated electrically conductive element.

18 Claims, No Drawings

PROCESS FOR MANUFACTURING A COMPOSITE MATERIAL

RELATED APPLICATIONS

This application is a National Phase Application of PCT/FR2015/050548 filed on Mar. 5, 2015, which in turn claims the benefit of French Patent Application No. 14 52231, filed on Mar. 18, 2014 the entirety of which are incorporated herein by reference.

BACKGROUND

Field of the Invention

The present invention relates to a process for the manufacture of a composite material comprising functionalized carbon nanotubes and a metal matrix, to a process for the manufacture of an elongated electrically conducting element and to an electric cable comprising such an elongated electrically conducting element.

The present invention typically but not exclusively applies to the motor vehicle, aeronautical, computing, electronics (e.g. semiconductors) and construction fields, in which composite materials are increasingly used. Such composite materials can comprise a metal matrix (e.g. aluminum, magnesium, titanium, and the like) and a carbon-based agent (e.g. carbon fibers) as reinforcer. Composite materials are prepared in order to attempt to reconcile the qualities of metals (ductility, conductivity, good resistance to aging and to high temperatures, and the like) with the lightness and the good mechanical properties characteristic of carbon-based agents.

The present invention applies in particular to low-voltage (in particular of less than 6 kV) or medium-voltage (in particular from 6 to 45-60 kV) or high-voltage (in particular greater than 60 kV, and which can range up to 800 kV) power cables, whether they are direct current or alternating current, in the fields of overhead, undersea or underground electricity transmission or aeronautics.

More particularly, the invention relates to an electric cable exhibiting good mechanical and electrical conductivity properties.

DESCRIPTION OF RELATED ART

The document CN-A-101565782 discloses a process for the manufacture of a composite material comprising carbon nanotubes and a metal matrix (e.g. aluminum, zinc, iron, nickel, and the like), said process comprising a stage of mixing a metal powder with carbon nanotubes, stearic acid and a solvent, such as an alcohol, then a stage of grinding the mixture from the preceding stage in a bead mill in order to form a uniform mixture and, finally, a stage of compression of the uniform mixture from the preceding stage in a mold preheated to 80° C., in order to form a composite material in the form of a solid mass. The solid mass obtained can subsequently be introduced into a liquid metal bath and cast.

During the grinding stage, the joint use of stearic acid and the solvent makes it possible both to prevent the cold welding of the metal particles during their plastic deformation and to momentarily protect them with regard to oxidation, in particular by ambient air and/or by moisture. However, this grinding stage does not facilitate the homogeneous dispersion of the carbon nanotubes in the metal matrix. Furthermore, although making it possible to avoid the entangling of the carbon nanotubes to give balls, it damages the mechanical and electrical properties of said carbon nanotubes. In addition, the process does not describe the stages leading to the manufacture of an electric cable from said composite material and, for this reason, does not make it possible to guarantee an electric cable having good mechanical and electrical properties.

At the same time, research groups have been interested in the technology of metal foams. Metal foams are cellular structures consisting of a solid metal containing a large volume of gas (i.e. containing gas-filled pores). The pores can be sealed (closed-cell foam) or they can form an interconnected network (open-cell foam). The main characteristic of metal foams is a very high porosity, generally of 75 to 95% of the volume.

A metal foam can equally well denote a syntactic foam as a metal sponge or as a metal foam as such.

A syntactic foam is a stochastic cellular metal (i.e. with a random distribution of the porosity), the cavities of which are spherical and interconnected with one another. In a syntactic foam, the pores communicate with one another via orifices with a much lower dimension than their mean size. A syntactic foam has semi-open pores.

A metal sponge is a stochastic cellular metal, the cavities of which are interconnected with one another, in which cellular metal the metal is distributed in the form of ligaments. In a metal sponge, the pores are in communication with one another. A metal sponge has open pores.

A metal foam as such is a cellular metal exhibiting cavities which are isolated from one another, which are overall polyhedral and which are separated by fine partitions, known as films. In a metal foam as such, the pores are isolated from one another. A metal foam has closed pores.

All these metal foams give highly advantageous physical and mechanical properties as a result of their structure since they exhibit a good stiffness in combination with a low density and excellent dampening characteristics. They thus have great potential in light structures, the absorption of energy and thermal control and are used in fields such as aeronautics or aerospace and also mechanical engineering (e.g. manufacture of motor vehicle safety components, such as fenders, deformation bars, hoods, and the like).

A metal foam is said to be regular when the structure is ordered. By way of example, the process by the "CastFoam" casting route developed by the CTIF (Centre Technique des Industries de la Fonderie) makes it possible to produce metal structures with regular cells, the size of which can vary from 10 mm to 70 mm. In order to manufacture this foam, plates made of agglomerated sand, the shape of which is studied for each application, are used as casting cores. The process consists of the design of these plates and the infiltration of a liquid metal inside the porous network created. It makes it possible to produce "perfect" foams, that is to say that they respect Plateau's conditions, in particular by producing pores with the shape of a Kelvin truncated octahedron (known as Kelvin's conjecture) [Kelvin, *Philosophical Magazine*, 1887, 24(151), 503].

However, none of the processes of the prior art uses the metal foams to result in a composite material or in an electrically conducting element for an electric cable exhibiting improved electrical and mechanical properties.

OBJECTS AND SUMMARY

The aim of the present invention is to overcome the disadvantages of the techniques of the prior art by providing a process for the manufacture of a composite material comprising functionalized carbon nanotubes and at least one metal, said process being easy to carry out and making it possible to guarantee and to maintain good transfer of mechanical and electrical load between the metal and the carbon nanotubes while preventing the degradation of the carbon nanotubes, and thus to obtain a composite material exhibiting good mechanical and electrical properties.

DETAILED DESCRIPTION

A first subject matter of the present invention is a process for the manufacture of a composite material comprising functionalized carbon nanotubes and a metal matrix, characterized in that it comprises at least the following stages:
i) the dispersing of functionalized carbon nanotubes or of a mixture of functionalized carbon nanotubes and of at least one metal in an open-pore or semi-open-pore metal foam, in order to form a composite structure,
ii) the compacting of the composite structure obtained in the preceding stage i) in order to form a composite material in the form of a solid mass.

By virtue of the process of the invention, a composite material comprising carbon nanotubes and a metal matrix can thus be easily formed, while exhibiting good mechanical and electrical conductivity properties, in particular due to the homogeneous dispersion of the carbon nanotubes in the metal foam.

The carbon nanotubes are in particular an allotropic form of carbon belonging to the family of the fullerenes. More particularly, the carbon nanotubes are graphene sheets wound over themselves and closed at their end by hemispheres similar to fullerenes.

In the present invention, the carbon nanotubes comprise both single wall carbon nanotubes (SWNTs) comprising just one graphene sheet and multi-wall carbon nanotubes (MWNTs) comprising several graphene sheets fitted into one another in the manner of Russian dolls, or else a single graphene sheet wound several times over itself.

In the present invention, the expression "functionalized carbon nanotubes" means that the carbon nanotubes exhibit, at the surface, chemical groups which can be bonded to the metal of the metal foam, optionally to carbon atoms of other carbon nanotubes, and optionally to the metal of the mixture of stage i). Said chemical groups can thus represent sites of attachment between the metal of the metal foam and the carbon nanotubes, optionally between the carbon atoms of the carbon nanotubes, and optionally between the metal of the mixture of stage i) and the carbon nanotubes during the implementation of the process of the invention.

This is because carbon nanotubes as such (i.e. bare of nonfunctionalized carbon nanotubes), even if they exhibit excellent electrical, thermal and mechanical properties, disperse with difficulty in a metal. The entangling of the carbon nanotubes to give balls, associated with a low surface reactivity, prevents them from dispersing. It is thus advantageous to have carbon nanotubes, the surface of which is covalently modified.

Such chemical groups can be chosen from a halogen atom, a fluoroalkyl group, a fluoroaryl group, a fluorocycloalkyl group, a fluoroaralkyl group, an $SO_3H$ group, a COOH group, a $PO_3H_2$ group, an OOH group, an OH group, a CHO group, a CN group, a COCl group, a COSH group, an SH group and the following groups: R'CHOH, NHR', COOR', SR', CONHR', OR' and $NHCO_2R'$, in which R' is chosen from a hydrogen atom, an alkyl group, an aryl group, an arylSH group, a cycloalkyl group, an aralkyl group, a cycloaryl group and a poly(alkyl ether) group. The direct incorporation of such chemical groups at the surface of carbon nanotubes makes it possible to improve the carbon nanotubes/metal interface when the carbon nanotubes are brought into contact with at least one metal.

According to a first alternative form, the functionalized carbon nanotubes used during the implementation of stage i) of the process in accordance with the invention are of commercial grade. Mention may be made, by way of example, of multi-wall carbon nanotubes functionalized by carboxyl groups, such as those sold under the trade name MWNT-COOH® by Alpha Nano Tech Inc. or by Nanocyl, or else multi-wall carbon nanotubes functionalized by hydroxyl groups, such as those sold under the trade name MWNT-OH® by NanoAmor.

According to a second alternative form, the functionalized carbon nanotubes are obtained by functionalization of bare carbon nanotubes.

Different methods well known to a person skilled in the art exist for modifying surfaces of carbon nanotubes. They can be grouped together into two main classes of methods:
some methods employ strong oxidizing agents and make possible the formation of oxygen-based chemical groups: by electrochemical oxidation at the decomposition potential of water, by acid treatment (sulfuric acid or nitric acid), by use of $KMnO_4$, by gas-phase oxidation or by plasma treatment. The term "nonspecific functionalization methods" is then used, due to the great variety of oxygen-based chemical groups formed on the carbon-based surface. Such oxygen-based chemical groups are, for example, diketone, ether, carboxylic acid, ester, hydroxyl, enol and the like groups.
other, milder, methods make possible the grafting of specific chemical groups: they concern methods for the electrochemical oxidation of primary and secondary amines, of alcohols, of carboxylates or of hydrazides, or also for the reduction of diazonium salts.

Mention may be made, by way of example, of the surface oxidation of carbon nanotubes, which is currently one of the most widely used methods for functionalizing said carbon nanotubes. In particular, said surface oxidation can be carried out by introducing nonfunctionalized carbon nanotubes into a liquid medium, such as a lower alcohol (that is to say, an alcohol having from 1 to 5 carbon atoms), by dispersing them with ultrasound and by adding, to the dispersion, an oxidizing agent, such as the nitric acid/sulfuric acid mixture or aqueous hydrogen peroxide solution. Functionalized carbon nanotubes exhibiting, at the surface, oxygen-based chemical groups of the type of diketone, ether, carboxylic acid, ester, hydroxyl, enol and the like groups, are thus obtained.

The functionalization of the carbon nanotubes promotes the transfer of mechanical and electrical load within the composite material between the carbon nanotubes and the metal matrix.

In a specific embodiment of the invention, the functionalized carbon nanotubes can be modified (before stage i)) by grafting one or more metals to their prefunctionalized surface. Thus, functionalized carbon nanotubes comprising a metal deposit at their surface are obtained.

This grafting can, for example, be carried out chemically, by electrodeposition or by cathode sputtering.

It is possible to graft any type of metal to the surface of the functionalized carbon nanotubes, such as Ag, Au, Pd, Pt, Ru, Rh, Al, Ti, Cu or Ni.

This grafting thus makes it possible to improve the dispersing of the functionalized carbon nanotubes in the metal foam during stages i) and ii), and optionally in the mixture of stage i).

In the invention, a metal foam can denote both a syntactic foam and a metal sponge.

The mixing of functionalized carbon nanotubes and of at least one metal can be carried out according to a stage a) prior to stage i) by the solid route, by the liquid route or by the molten route.

Stage a)

In a specific embodiment, the metal of the mixture obtained in stage a) or used in stage i) can be chosen from copper, aluminum, a copper alloy, an aluminum alloy and one of their mixtures.

In a specific embodiment, the metal of the mixture obtained in stage a) or used in stage i) comprises metal particles exhibiting a mean size of particle diameter ranging from 10 nm to 50 µm approximately and preferably from 10 nm to 50 nm approximately.

In a specific embodiment of the invention, the functionalized carbon nanotubes exhibit a mean diameter ranging from 1 nm to 50 nm approximately.

The mixing according to stage a) by the solid route can be carried out by mechanical mixing of functionalized carbon nanotubes with at least one metal, said functionalized carbon nanotubes and said metal being in the form of powders.

In a specific embodiment, said mechanical mixing can be carried out at ambient temperature and preferably under a nonoxidizing atmosphere (e.g. under argon or under nitrogen).

Said mechanical mixing of functionalized carbon nanotubes with at least one metal is a method of mixing powders which is easy to employ and can be carried out using in particular means such as a planetary mixer, a steel or ceramic bead mixer, or mechanical vibrations, it being possible for said means to be used alone or in combination.

Preferably, the mixing by the solid route is carried out with a means which avoids damaging the carbon nanotubes, such as, for example, a ceramic bead mixer.

The mixing according to stage a) by the liquid route can preferably be carried out by dispersing functionalized carbon nanotubes and at least one metal salt in a liquid medium and by preferably subjecting the mixture thus obtained to treatment by ultrasound, so as to obtain a homogeneous dispersion.

Said mixing by the liquid route of stage a) then preferably comprises the following substages:

1b) the introduction of functionalized carbon nanotubes into a liquid medium, such as a lower alcohol, and their dispersion by ultrasound, in order to form a homogeneous dispersion, 2b) the addition of at least one metal salt to the homogeneous dispersion as obtained in stage 1b), and the treatment by ultrasound, 3b) the evaporation of the solvent in order to obtain a powder, 4b) the calcination of the powder obtained in stage 3b), in particular at a temperature which can range from 250° C. to 500° C. approximately, in order to obtain a calcined powder, 5b) the reduction of the calcined powder obtained in stage 4b), in particular under hydrogen, in order to form said mixture.

This method is particularly appropriate in the case where the functionalized carbon nanotubes of stage 1b) have been functionalized beforehand by surface oxidation.

This mixing method allows the functionalized carbon nanotubes to be directly implanted between the metal particles and not simply deposited at the surface of the metal particles.

When this mixing stage a) is carried by the solid route or by the liquid route, the agglomerates of functionalized carbon nanotubes break up and can thus be homogeneously distributed in the mixture.

The mixing according to stage a) can be carried out by mixing functionalized carbon nanotubes with at least one metal in the molten state.

The mixing according to stage a) is preferably carried out by the solid route or by the liquid route, these two routes being easy to carry out while avoiding damage to the carbon nanotubes.

Stage i)

Stage i) makes it possible to disperse the functionalized carbon nanotubes or the mixture of functionalized carbon nanotubes and of at least one metal in the metal foam.

In a specific embodiment of the invention, the functionalized carbon nanotubes of stage i) exhibit a mean diameter ranging from 1 nm to 50 nm approximately. The metal of the metal foam can be chosen from copper, aluminum, a copper alloy, an aluminum alloy and one of their mixtures.

The metal of the metal foam can be identical to or different from the metal of the mixture of stage a).

The metal foam is preferably a regular foam as defined above. In this way, stage i) makes it possible to homogeneously distribute the functionalized carbon nanotubes in said foam and to obtain a homogeneous composite structure.

In a specific embodiment, the metal foam comprises pores with a mean size ranging from 10 to 20 mm approximately.

The porosity of the metal foam can be at least 60% by volume approximately and preferably at least 80% by volume approximately, with respect to the total volume of the metal foam.

By way of example, the metal foam used in stage i) can be of commercial grade, such as the open-pore metal foam sold under the trade name Castfoam® by FTB (Fonderie Tabourin et Bezilles). This foam can be made of aluminum, aluminum alloy, copper or copper alloy.

Preferably, the metal foam does not comprise metal oxides. In this way, the presence of oxygen in the composite material and thus damage to the carbon nanotubes, in particular at high temperatures, are avoided.

Stage i) can be carried out by means of mechanical vibrations or of ultrasound in order to optimize the "filling" of the metal foam by the functionalized carbon nanotubes or by the mixture of functionalized carbon nanotubes and of at least one metal.

Stage i) can be carried out manually.

The composite structure of stage i) is in the form of an open-pore or semi-open-pore metal foam comprising a homogeneous dispersion of functionalized carbon nanotubes.

Stage ii)

As metal foams are deformable, the compacting of the composite structure according to stage ii) is facilitated and makes it possible to result in a composite material in the form of a solid mass, in particular of monoblock type, such as, for example, a bulk bar.

According to a first alternative form, stage ii) is carried out by pressing, using in particular a device chosen from hydraulic presses, cold or hot isostatic presses and cold or hot uniaxial presses.

The pressing stage is preferably carried out under hot conditions and more preferably still under a reducing atmosphere.

Thus, according to this first alternative form, the composite structure can first be placed in a mold and then the mold and also the composite structure can be subjected to a pressure which can range from 50 to 500 MPa approximately.

According to a second alternative form, stage ii) is carried out by sintering, that is to say by consolidation by the action of heat.

There exists overall two sintering techniques: conventional sintering and flash sintering. Stage ii) is preferably carried out by flash sintering.

The major difference between conventional sintering and flash sintering lies in the fact that the heat source is not external but that an electric current (direct, pulsed direct or alternating), applied via electrodes, passes through the conductive pressing chamber and also, in appropriate cases, through the sample. It is this electric current which will heat the sample, directly within it. Generally, flash sintering makes it possible to consolidate materials in much shorter times and with an often much better density than conventional sintering.

In a specific embodiment, stage ii) is carried out by flash sintering at a pressure which can range from 10 to 100 bar approximately and/or at a temperature which can range from 400 to 900° C. approximately. In the case where the metal used is aluminum, it will be preferable to apply a temperature which can range from 400 to 550° C. approximately and, in the case where the metal used is copper, it will be preferable to apply a temperature which can range from 700 to 900° C. approximately. The flash sintering time can preferably range from a few seconds to a few hours approximately.

When stage ii) is carried out by flash sintering, it is easier to control the diffusion of the functionalized carbon nanotubes into the composite material and the risk of damage to the carbon nanotubes/metal of the metal foam interfaces and optionally to the carbon nanotubes/metal of the mixture of stage i) interfaces is avoided.

The formation of a solid mass by flash sintering makes it possible to obtain a composite material with a degree of densification of at least 70% approximately and preferably of at least 80% approximately.

The composite material of the invention exhibits a porosity preferably of at most 5% by volume approximately and more preferably of at most 1% by volume approximately, with respect to the total volume of said composite material.

Stages i) and ii) preferably do not comprise the use of a binder, in particular of organic polymer type. This is because the functionalization of the carbon nanotubes is sufficient to allow good carbon/metal cohesion.

Preferably, the composite material of the invention is devoid of organic polymer(s). This is because the presence of organic polymers can damage its electrical properties, in particular its electrical conductivity.

The composite material obtained according to the process of the invention is preferably solely composed of the functionalized carbon nanotubes and of the metal matrix.

According to a preferred embodiment of the invention, the composite material comprises from 0.05 to 30% by weight of functionalized carbon nanotubes.

In the composite material of the invention, the chemical groups acting as attachment sites at the surface of the carbon nanotubes react with the metal of the metal foam and optionally with the metal of the mixture of stage i) during this stage ii), thus making it possible to obtain a good interface between the metal or the metals and the carbon nanotubes.

Thus, the process of the invention makes it possible to form, in two or three stages, a composite material comprising at least one metal and functionalized carbon nanotubes in which the carbon nanotubes are uniformly distributed.

The composite material obtained after stage ii) can subsequently be handled without risk, thus avoiding the safety constraints related to the direct and prolonged use of nanomaterials, such as carbon nanotubes.

Thus, by virtue of the process of the invention, the carbon nanotubes/metal interfaces are not or only very slightly mechanically stressed and they are retained throughout the process. This process then makes it possible to obtain a composite material having good electrical, in particular in terms of conductivity, and mechanical properties.

A second subject matter of the present invention is a process for the manufacture of an elongated electrically conducting element comprising functionalized carbon nanotubes and a metal matrix, characterized in that it comprises the following stages:

A) the manufacture of a composite material according to the process in accordance with the first subject matter of the invention, and B) at least one stage of shaping said composite material obtained in the preceding stage A), in order to obtain said elongated electrically conducting element having the desired dimensions and shape.

The applicant company has demonstrated that said process in accordance with the second subject matter of the invention makes it possible to obtain an elongated electrically conducting element having a mechanical strength 2 to 3 times greater than that obtained with an elongated electrically conducting element formed solely of a metal of copper or aluminum type or one of their alloys and an electrical conductivity increased by approximately 20% with respect to the latter.

This is because the composite material obtained according to stage A) can be used in one or more shaping stages B) well known to a person skilled in the art, such as shaping by melting, by extrusion or by plastic deformation.

According to a first alternative form, stage B) is a stage of shaping by plastic deformation or by extrusion and the composite material manufactured in stage A) comprises from 0.05 to 1% by weight approximately of functionalized carbon nanotubes and preferably from 0.05 to 0.5% by weight approximately of functionalized carbon nanotubes.

When the shaping is carried out by plastic deformation, stage B) can comprise the following stage or stages: a stage of spinning and/or a stage of drawing and/or a stage of rolling and/or a stage of hammering the composite material of stage A).

According to a second alternative form, stage B) is a stage of shaping by melting and it comprises the following sub-stages:

B-1) the introduction of the composite material manufactured in stage A) into a liquid metal bath, B-2) the mixing of the composite material with the liquid metal bath, so as to completely melt the composite material in the liquid metal bath, and B-3) the casting of the mixture of the preceding stage, in order to form said elongated electrically conducting element.

The metal of the liquid metal bath of stage B-1) can be chosen from copper, aluminum, a copper alloy, an aluminum alloy and one of their mixtures.

In a specific embodiment, the liquid metal bath of stage B-1) has a temperature ranging from 550° C. to 1200° C. approximately and preferably from 700° C. to 1100° C. approximately.

The mixing of stage B-2) can be carried out by techniques well known to a person skilled in the art, such as mechanical stirring, magnetic stirring or the use of an electromagnetic current.

In a specific embodiment, the casting stage B-3) is carried out at a casting temperature ranging from 550° C. to 1200° C. approximately and preferably from 700° C. to 1100° C. approximately. This casting stage can comprise a stage of cooling (i.e. solidification) at a controlled rate.

In this specific embodiment of shaping (i.e. by melting), the composite material manufactured in stage A) preferably comprises from 0.05 to 5% by weight approximately and more preferably from 0.25 to 1% by weight approximately of functionalized carbon nanotubes.

These various deformation and/or shaping stages can be carried out using means well known to a person skilled in the art.

The elongated electrically conducting element obtained according to the process of the invention preferably consists solely of the functionalized carbon nanotubes and of the metal matrix.

The elongated electrically conducting element exhibits a porosity preferably of at most 1% by volume approximately and more preferably at most 0.5% by volume approximately, with respect to the total volume of said elongated electrically conducting element.

A third subject matter of the present invention is an electric cable, characterized in that it comprises an elongated electrically conducting element obtained by the process in accordance with the second subject matter of the invention.

Said cable exhibits improved mechanical and electrical properties.

The electric cable of the invention can comprise a plurality of elongated electrically conducting elements obtained by the process in accordance with the second subject matter of the invention.

In a specific embodiment, the electric cable of the invention additionally comprises at least one electrically insulating layer surrounding said elongated electrically conducting element or the plurality of elongated electrically conducting elements, said electrically insulating layer comprising at least one polymer material.

The polymer material of the electrically insulating layer of the cable of the invention can be chosen from crosslinked and noncrosslinked polymers, polymers of the inorganic type and polymers of the organic type.

The polymer material of the electrically insulating layer can be a homo- or a copolymer having thermoplastic and/or elastomeric properties.

The polymers of the inorganic type can be polyorganosiloxanes.

The polymers of the organic type can be polyolefins, polyurethanes, polyamides, polyesters, polyvinyls or halogenated polymers, such as fluoropolymers (e.g. polytetrafluoroethylene PTFE) or chloropolymers (e.g. polyvinyl chloride PVC).

The polyolefins can be chosen from ethylene and propylene polymers. Mention may be made, as examples of ethylene polymers, of linear low density polyethylenes (LLDPEs), low density polyethylenes (LDPEs), medium density polyethylenes (MDPEs), high density polyethylenes (HDPEs), ethylene/vinyl acetate copolymers (EVAs), ethylene/butyl acrylate copolymers (EBAs), ethylene/methyl acrylate copolymers (EMAs), ethylene/2-hexylethyl acrylate (2HEA) copolymers, copolymers of ethylene and of α-olefins, such as, for example, polyethylene/octenes (PEOs), ethylene/propylene copolymers (EPRs), ethylene/ethyl acrylate copolymers (EEAs) or ethylene/propylene terpolymers (EPTs), such as, for example, ethylene/propylene/diene monomer terpolymers (EPDMs).

More particularly, the electric cable in accordance with the third subject matter of the invention can be an electric cable of power cable type. In this case, the elongated electrical conducting element manufactured according to the process in accordance with the second subject matter of the invention is surrounded by a first semiconducting layer, the first semiconducting layer being surrounded by an electrically insulating layer as defined above and the electrically insulating layer being surrounded by a second semiconducting layer.

In a specific embodiment, generally in accordance with the electric cable of power cable type of the invention, the first semiconducting layer, the electrically insulating layer and the second semiconducting layer constitute a three-layer insulation. In other words, the electrically insulating layer is directly in physical contact with the first semiconducting layer and the second semiconducting layer is directly in physical contact with the electrically insulating layer.

The electric cable of the invention can additionally comprise a metallic shield surrounding the second semiconducting layer.

This metallic shield can be a "wire" shield composed of an assembly of conductors made of copper or aluminum arranged around and along the second semiconducting layer, a "strip" shield composed of one or more conducting metal strips positioned helically around the second semiconducting layer, or a "leaktight" shield of metal tube type surrounding the second semiconducting layer. The latter type of shield makes it possible in particular to form a barrier to the moisture which has a tendency to penetrate the electric cable in a radial direction.

All the types of metallic shields can play the role of earthing the electric cable and can thus transmit fault currents, for example in the event of short-circuit in the network concerned.

In addition, the cable of the invention can comprise an external protective sheath surrounding the second semiconducting layer or else more particularly surrounding said metallic shield, when it exists. This external protective sheath can be made conventionally from appropriate thermoplastic materials, such as HDPEs, MDPEs or LLDPEs; or also materials which retard flame propagation or withstand flame propagation. In particular, if the latter do not comprise halogen, reference is made to sheathing of HFFR (Halogen-Free Flame Retardant) type.

Other layers, such as layers which expand in the presence of moisture, can be added between the second semiconducting layer and the metallic shield, when it exists, and/or between the metallic shield and the external sheath, when they exist, these layers making it possible to ensure the longitudinal leaktightness toward water of the electric cable.

The invention claimed is:

1. A process for manufacture of a composite material having functionalized carbon nanotubes and a metal matrix, said process comprising the steps of:
   i) dispersing of functionalized carbon nanotubes or of a mixture of functionalized carbon nanotubes and of at least one metal in an open-pore or semi-open-pore metal foam, in order to form a composite structure; and ii) compacting of the composite structure obtained in the preceding stage i) in order to form a composite material in the form of a solid mass.

2. The process as claimed in claim 1, wherein the metal foam is a syntactic foam or a metal sponge.

3. The process as claimed in claim 1, wherein mixing of functionalized carbon nanotubes and of at least one metal is carried out according to a stage a) prior to stage i) by a liquid route, by a solid route or by a molten route.

4. The process as claimed in claim 1, wherein the at least one metal is chosen from copper, aluminum, a copper alloy, an aluminum alloy and one of their mixtures.

5. The process as claimed in claim 1, wherein the open pore or semi-open pore metal foam has a metal chosen from copper, aluminum, a copper alloy, an aluminum alloy and one of their mixtures.

6. The process as claimed in claim 1, wherein the metal foam is regular.

7. The process as claimed in claim 1, wherein the metal foam comprises pores with a mean size ranging from 10 to 20 mm.

8. The process as claimed in claim 1, wherein stage ii) is carried out by pressing.

9. The process as claimed in claim 1, wherein stage ii) is carried out by sintering.

10. The process as claimed in claim 1, wherein the composite material of stage ii) exhibits a porosity of at most 5% by volume, with respect to a total volume of said composite material.

11. The process as claimed in claim 1, wherein the composite material comprises from 0.05 to 30% by weight of functionalized carbon nanotubes.

12. A process for manufacture of an elongated electrically conducting element having functionalized carbon nanotubes and a metal matrix, said process comprising the steps of:
A) manufacturing of a composite material according to the process as defined in claim 1; and
B) at least one stage of shaping said composite material obtained in the preceding stage A), in order to obtain said elongated electrically conducting element having desired dimensions and shape.

13. The process as claimed in claim 12, wherein stage B) is a stage of shaping by melting, by extrusion or by plastic deformation.

14. The process as claimed in claim 13, wherein stage B) is a stage of shaping by extrusion or by plastic deformation and the composite material manufactured in stage A) comprises from 0.05 to 1% by weight of functionalized carbon nanotubes.

15. The process as claimed in claim 13, wherein stage B) is a stage of shaping by melting and it comprises the following substages:
B-1) introduction of the composite material manufactured in stage A) into a liquid metal bath;
B-2) mixing of the composite material with the liquid metal bath, so as to completely melt the composite material in the liquid metal bath; and
B-3) casting of the mixture of the preceding stage, in order to form said elongated electrically conducting element.

16. The process as claimed in claim 15, wherein the liquid metal bath of stage B-1) has a metal chosen from copper, aluminum, a copper alloy, an aluminum alloy and one of their mixtures.

17. The process as claimed in claim 15, wherein the liquid metal bath of stage B-1) has a temperature ranging from 550° C. to 1200° C.

18. The process as claimed in claim 15, wherein the composite material manufactured in stage A) comprises from 0.05 to 5% by weight of functionalized carbon nanotubes.

* * * * *